United States Patent [19]

Vieux-Rochaz et al.

[11] Patent Number: 5,798,895
[45] Date of Patent: Aug. 25, 1998

[54] MAGNETIC READING HEAD HAVING A MAGNETORESISTANT ELEMENT AND IMPROVED POLARIZATION MEANS

[75] Inventors: Line Vieux-Rochaz, Sassenage; Jean-Marc Fedeli, Beaucroissant; Philippe Pougnet, Vaureal; Michel Poirier, Pontoise, all of France

[73] Assignee: Commissariat a l'Energie Atomique, Paris, France

[21] Appl. No.: 792,707

[22] Filed: Jan. 29, 1997

Related U.S. Application Data

[63] Continuation of Ser. No. 394,806, Feb. 27, 1995, abandoned.

[30] Foreign Application Priority Data

Feb. 28, 1994 [FR] France ................... 94 02258

[51] Int. Cl.$^6$ .................................................. G11B 5/127
[52] U.S. Cl. .................................................. 360/113
[58] Field of Search ........................... 360/113, 126, 360/121, 125; 338/32 R; 324/252

[56] References Cited

U.S. PATENT DOCUMENTS

| | | | |
|---|---|---|---|
| 5,159,511 | 10/1992 | Das | 360/113 |
| 5,168,408 | 12/1992 | Lazzari | 360/113 |
| 5,168,409 | 12/1992 | Koyama et al. | 360/113 |
| 5,225,951 | 7/1993 | Kira et al. | 360/113 |
| 5,255,141 | 10/1993 | Valstyn et al. | 360/126 |
| 5,274,520 | 12/1993 | Matsuzono et al. | 360/113 |
| 5,274,521 | 12/1993 | Miyauchi et al. | 360/113 |

FOREIGN PATENT DOCUMENTS

| | | |
|---|---|---|
| 0 325 365 | 7/1989 | European Pat. Off. . |
| 59-71118 | 4/1984 | Japan . |
| 01145520 | 6/1989 | Japan . |
| 02187911 | 7/1990 | Japan . |
| 05182146 | 7/1993 | Japan . |
| WO 93/08562 | 4/1993 | WIPO . |

OTHER PUBLICATIONS

Patent Abstracts of Japan, vol. 13, No. 185 (P-865)(3533), May 2, 1989, JP-A-01 013 209, Jan. 18, 1989.
Patent Abstracts of Japan, vol. 8, No. 31 (P-253), Feb. 9, 1984, JP-A-58 185 019, Oct. 28, 1983.
Patent Abstracts of Japan, vol. 11, No. 253 (P-606), Aug. 18, 1987, JP-A-62 058 411, Mar. 14, 1987.
Patent Abstracts of Japan, vol. 7, No. 57 (P-181)(1202), Mar. 9, 1983, JP-A-57 203226, Dec. 13, 1982.
Patent Abstracts of Japan, vol. 11, No. 311 (P-625), Oct. 12, 1987, JP-A-62 102 411, May 12, 1987.
Patent Abstracts of Japan, vol. 6, No. 51 (P-108), Apr. 6, 1982, JP-A-56 165 923, Dec. 19, 1981.
Patent Abstracts of Japan, vol. 10, No. 330 (P-514)(2386), Nov. 11, 1986, JP-A-61 134913, Jun. 23, 1986.
Patent Abstracts of Japan, vol. 9, No. 334 (P-417)(2057), Dec. 27, 1985 & JP-A-60 157712, Aug. 19, 1985.

*Primary Examiner*—Stuart S. Levy
*Assistant Examiner*—David D. Davis
*Attorney, Agent, or Firm*—Oblon, Spivak, McClelland, Maier & Neustadt, P.C.

[57] ABSTRACT

A magnetic reading head having a magneto resistant element and improved polarization means. The polarization conductor is associated with a supplementary magnetic layer positioned opposite to the magnetoresistant element.

12 Claims, 5 Drawing Sheets

MAGNETIC READING HEAD HAVING A MAGNETORESISTANT ELEMENT AND IMPROVED POLARIZATION MEANS

This application is a Continuation of application Ser. No. 08/394,806, filed on Feb. 27, 1995, now abandoned.

DESCRIPTION

1. Technical Field

The present invention relates to a magnetic reading head having a magnetoresistant element and improved polarization means.

The head according to the invention is in particular a reading head. However, it can be equipped with supplementary means making it suitable for a writing function. The invention is used in magnetic recording or in the measurement of magnetic fields.

2. Prior Art

The invention more particularly applies to so-called "thin film horizontal" heads, such as is shown in FIG. 1. It is possible to see an e.g. silicon semiconductor substrate 10, in which has been etched a recess 12, which contains a lower magnetic layer 14, which has been formed electrolytically and has been extended by two vertical pillars $16_1$, $16_2$. The pillars are surrounded by a coil 18 which is embedded in an semiconductor substrate 10. The magnetic circuit is completed by two upper pole pieces $22_1$, $22_2$ separated by an a magnetic spacer 24 defining the head gap. An e.g. iron-nickel magneto-resistant element MR is placed beneath the a magnetic spacer 24. The element is obtained by photoengraving using the spacer as the mask. It is therefore self-aligned relative to the spacer Not shown means are provided for passing a current into the magnetoresistant element MR and for measuring its resistance variations (variation of current at constant voltage or vice versa). The head moves in front of a magnetic support 30 (tape, disk, etc.) on which are recorded the informations to be read or written.

Diagrammatically such a head operates in the following way.

On writing, the current flowing in the coil 18 creates a magnetic field and consequently an induction in the magnetic circuit. The field lines, which spread out around the spacer, induce a magnetization in the support 30.

On reading, a magnetic information recorded in the support 30 produces a magnetic reading field and consequently an induction in the magnetic circuit. This induction is partly closed again across the magnetoresistant element MR. This leads to a magnetization in said element, which will cause a variation to its resistance.

Such a head is described in FR-A-2 645 314 and FR-A-2 657 189.

Another known magnetic head type is illustrated by FIG. 2. This head has the elements already shown in FIG. 1 and which carry the same reference numerals. The head shown differs from that of FIG. 1 by the presence of two magnetic layers $31_1$, $31_2$ spaced from one another and in contact with upper pole pieces. These layers define another head gap 32, located below the main head gap 24. The magnetoresistant element MR is located in the vicinity of and through said head gap 32.

FIG. 2 also shows an electrical conductor C serving as a polarization means for the magnetoresistant element MR. Through said conductor C flows an electric current directed perpendicular to the plane of the drawing. The conductor C has a face f1 facing the magnetoresistant element MR and a face f2 opposite to said element. Such a head is described in French patent application 93 13249 filed on Nov. 8 1993.

Other heads are known, such as those disclosed by the aforementioned FR-A-2 657 189. These heads have a simplified magnetic circuit with only two upper pole piece, or with two upper pole pieces and a lower pole piece, which is not in contact with the upper pole pieces (cf. FIGS. 3 and 4 of said document).

In both cases, a magnetoresistant element is located below the head gap and a current flows through a polarization conductor.

In all these cases, the current flowing in the polarization conductor creates a magnetic field, which is closed again across the magnetoresistant element and which is superimposed on the field to be read. The polarization field is generally regulated in such a way that the resistance variations of the magnetoresistant element are linear as a function of variations of the field to be read.

Although satisfactory in certain respects, these heads suffer from a disadvantage. Thus, the magnetic field produced by the current flowing in the polarization conductor is intercepted by the magnetic circuit of the head. In other words, it tends to follow this magnetic circuit for closing again. The attached FIG. 3 shows the lines of this field in the zone of the two head gaps (main head gap 24 and other head gap 32) for a known head in accordance with FIG. 2. It can be seen that the field passes into the magnetoresistant element, but also follows the magnetic circuit. Thus, a constant stray field will be produced, which will lead to a modification to the informations recorded on the support and will bring about an asymmetry in the shape of the reading signal. The invention aims at obviating this disadvantage.

DESCRIPTION OF THE INVENTION

To this end, the invention proposes an improvement to the magnetoresistant element polarization means. This improvement leads both to a reduction in the current necessary for the polarization and to a reduction of the stray field produced in the head gap.

This object is achieved by using a supplementary magnetic layer placed on the polarization conductor on the side opposite to the magnetoresistant element. This layer has the effect of channelling the magnetic field created by the conductor and without this arrangement said field would pass to the main head gap.

In addition, the detection current passing through the magnetoresistant element and which is used for measuring the resistance variation thereof, also creates a magnetic field, which will also be attracted by the supplementary magnetic layer. This will lead to an increase in the magnetization of said layer and consequently and by mirror effect to an increase in the polarization of the magnetoresistant element. The effect produced by the addition of said magnetic layer is therefore doubly beneficial.

Thus, as a result of the invention, it is possible to reduce the polarization current by approximately 20%, which reduces by the same amount the JOULE losses and the heating of the head. The fact that the magnetic layer is in contact with the conductive layer also increases the efficiency of the arrangement.

The supplementary magnetic layer is preferably made from a soft magnetic material. This can be in the form of ironbased alloys, such as iron-nickel or Sendust (registered trademark), which is an alloy of 85% iron, 5.4% aluminium and 9.6% silica (by weight)) or alloys based on cobalt such as cobalt-zirconium-niobium. Its thickness can be between 100 and 500 nm, preferably close to 200 nm. Its width is substantially equal to the width of the polarization conductor.

The presence of this supplementary magnetic layer does not complicate the process of producing the head, because the conductor-magnetic layer assembly can be produced in a single etching operation.

The invention is applicable to random reading heads, particularly those described hereinbefore, or to those which would use a magnetoresistant element and a polarization conductor.

DETAILED DESCRIPTION OF EMBODIMENTS

Figure 3:
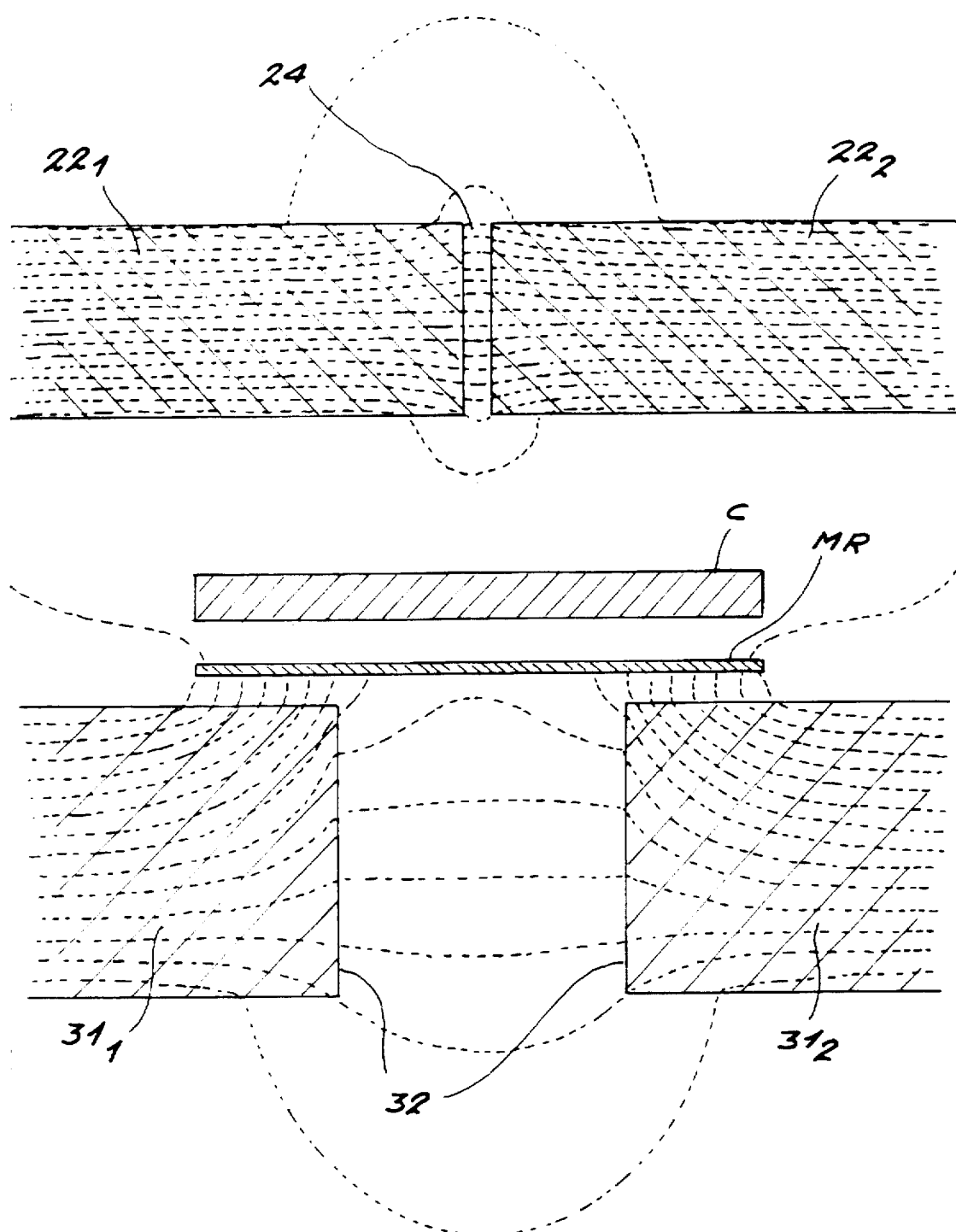
FIG. 3, already described, shows the magnetic field polarization lines in a head like that of FIG. 2.
Figure 4:
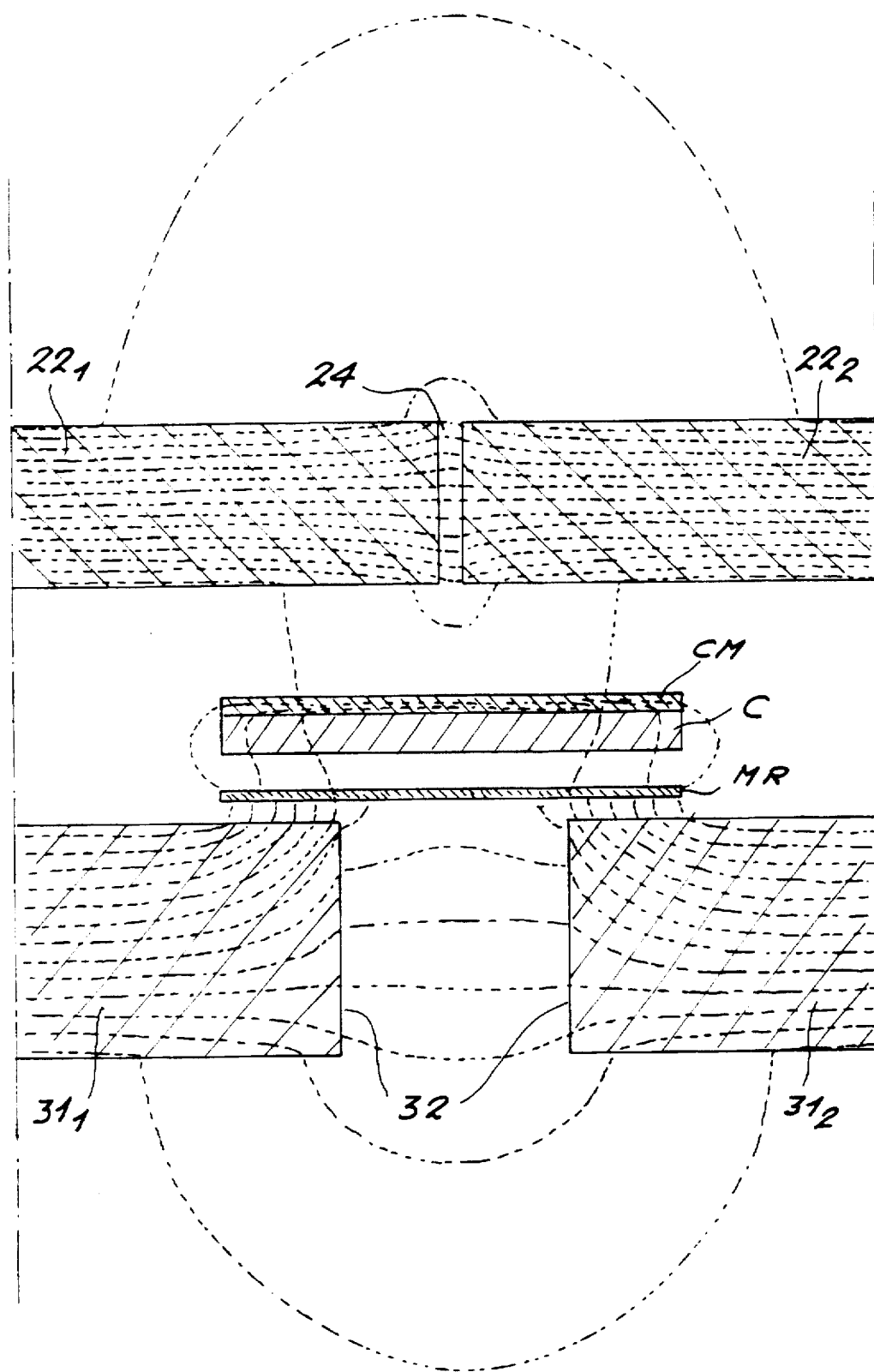
FIG. 4 shows the new distribution of the field lines in the case of the invention.

FIG. 4 corresponds to the already described FIG. 3 and shows, in section, the central part of a magnetic reading head with two upper pole pieces $22_1$, $22_2$, a head gap 24, magnetic layers $31_1$, $31_2$ defining a second head gap 32, a magnetoresistant element MR and its polarization conductor C. The head shown in FIG. 4 differs from that of FIG. 3 by the presence of a supplementary magnetic layer CM. It can be seen that the polarization field lines are channelled by the supplementary layer CM. The field lines are contracted in the polarization conductor zone, which reduces leaks to the upper pole pieces $22_1$, $22_2$.

Figure 5:
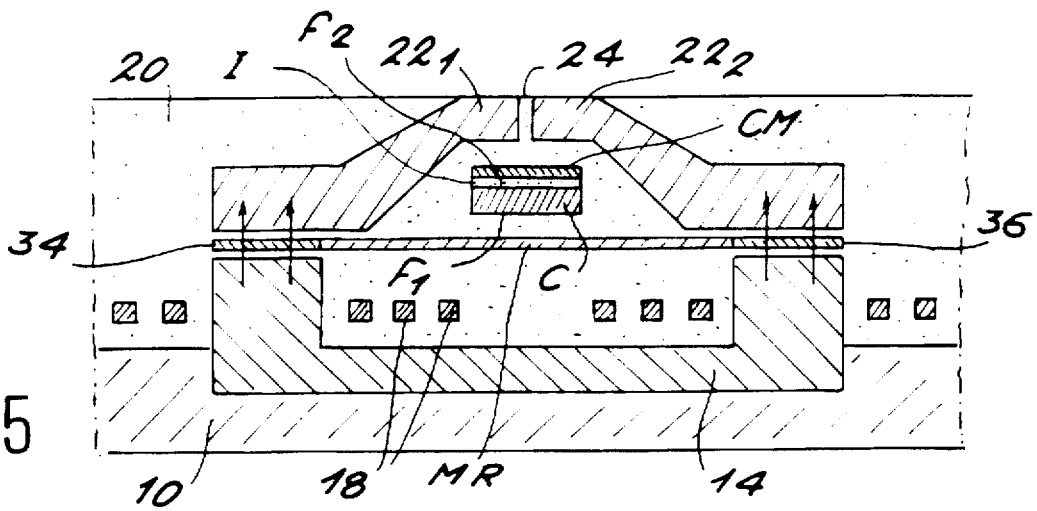
FIG. 5 shows a known magnetic head having a longitudinal magnetoresistant element, which has been improved in accordance with the invention.

FIG. 5 shows a magnetic reading and writing head of a known type (described in French patent application EN 93 13252 filed on Nov. 8 1993). This head differs from the others by the fact that the magnetoresistant element MR extends from one pole piece $22_1$ to the other $22_2$. This element is connected to two contact elements 34, 36 located at the two ends, said elements being themselves connected to not shown means able to produce a current flowing in the magnetoresistant element MR. In this particular case, said element is a multilayer material and its cross-section is smaller than that of the upper pole pieces in order to obtain a reading field concentration effect.

The head of FIG. 5 is improved in its magnetoresistant element polarization means. These means not only comprise a polarization conductor C, but also a supplementary magnetic layer CM. In the illustrated variant, the supplementary magnetic layer is separated from the conductor C by an a magnetic, electric insulating layer I. This layer can be of e.g. $SiO_2$ or $Si_3N_4$.

Figure 6:
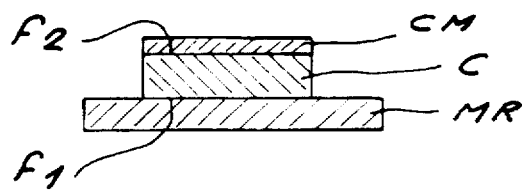
FIG. 6 is a section illustrating a compact embodiment of the magnetoresistant element-supplementary magnetic layer-polarization conductor assembly.

FIG. 6 shows in section an embodiment in which the assembly 10 of the magnetoresistant element MR, polarization conductor C and supplementary magnetic layer CM is compact, the three elements being in contact with one another. The face f1 of the conductive element C is in contact with the magnetoresistant element MR and its face f2 is in contact with the magnetic layer CM.

Figure 7A:
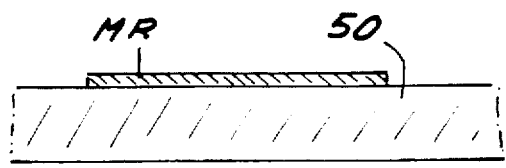
FIGS. 7 to 7c show various stages in a process for the production of the magnetoresistant element-polarization conductor-supplementary magnetic layer assembly.
Figure 7B:
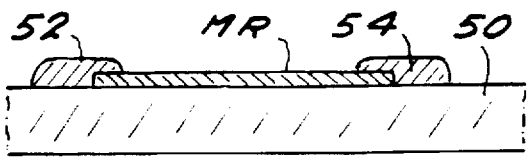
Figure 7C:
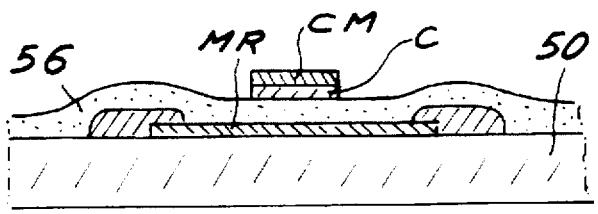

FIGS. 7a to 7c illustrate four stages of a particular embodiment of a magnetoresistant element and its polarization means improved in accordance with the invention.

There is an e.g. silicon or ceramic substrate 50 (FIG. 7a), on which is deposited a magnetoresistant material layer, e.g. an alloy of iron, nickel, cobalt and/or an FeNi/Ag multilayer.

This layer is etched so as to only leave the necessary ribbon MR. The width of the magnetoresistant element must exceed that of the head gap and in exemplified manner said width will be 6 µm.

This is followed by the deposition of an electrically conductive layer, e.g. of CrAu, TiWAu or MoAu and cathodic sputtering can be used. This layer is etched so as to only leave contacts 52, 54 at each end of the magnetoresistant element (FIG. 7b). This is followed by the deposition of an a magnetic, insulating material layer 56, e.g. of $SiO_2$ (FIG. 7c). This is followed by the deposition of a conductive layer and then a soft magnetic layer, e.g. by cathodic sputtering or vapour deposition. This layer can be an iron alloy, e.g. FeNi, Sendust (registered trademark) or a cobalt alloy, e.g. CoZrNb. The thickness can be 0.2 µm. These two layers are etched in order to give them the shape of a ribbon.

The production of the head is then continued in the manner described in the aforementioned documents. If it is only wished to have a reading head, no conductive coil will be formed around the magnetic circuit. If it is wished to obtain a reading and writing head such a coil must be formed.

Figure 8:
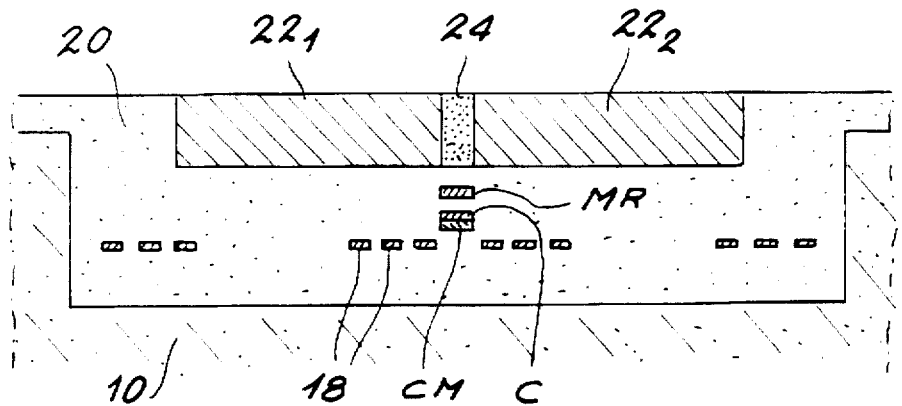
FIG. 8 shows another magnetic head of a known type improved according to the invention.

FIG. 8 illustrates a reading and writing head of the type described in the aforementioned FR-A-2 657 189. Once again there is the substrate 10, the conductive coil 18 embedded in the insulator 12, together with the pole pieces $22_1$, $22_2$ and the head gap 24 in the form of an a magnetic spacer 24, but there is no other pole piece. The magnetoresistant element MR is placed directly beneath the a magnetic spacer 24. The polarization conductor C is placed beneath the element MR and the supplementary magnetic layer CM according to the invention beneath the conductor C.

Figure 9:
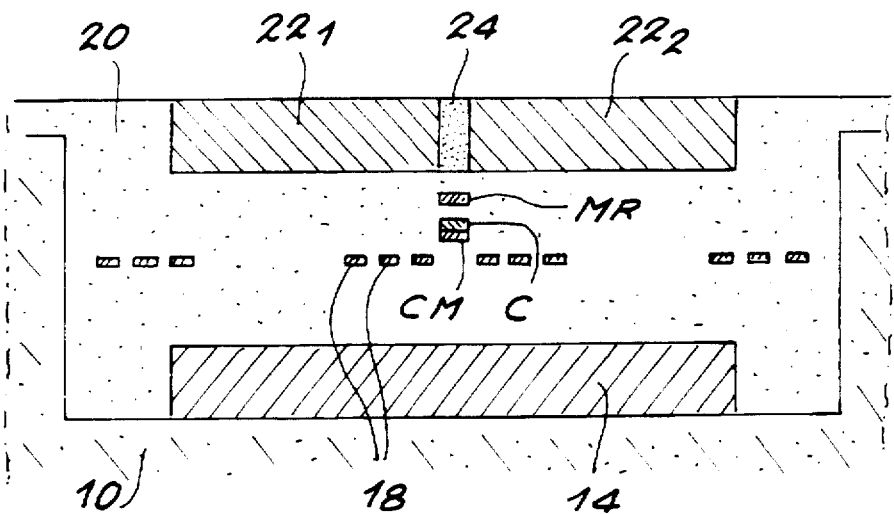
FIG. 9 shows another magnetic head of a known type improved according to the invention.

The magnetic head shown in FIG. 9 only differs from that of FIG. 8 by the presence of a lower magnetic part 14.

Figure 1:
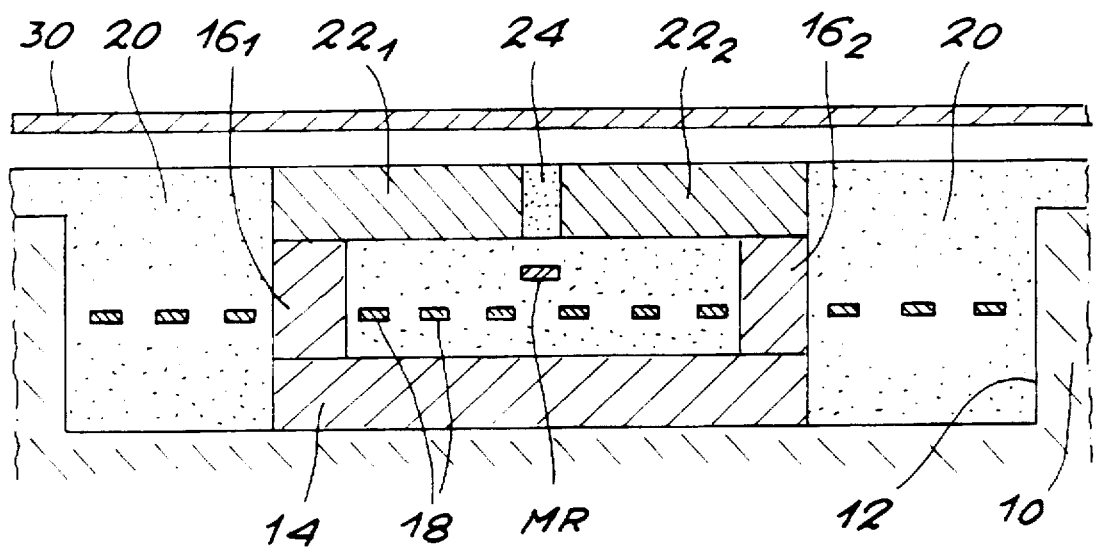
FIG. 1, already described, shows a known horizontal head having a magnetoresistant element.
Figure 2:
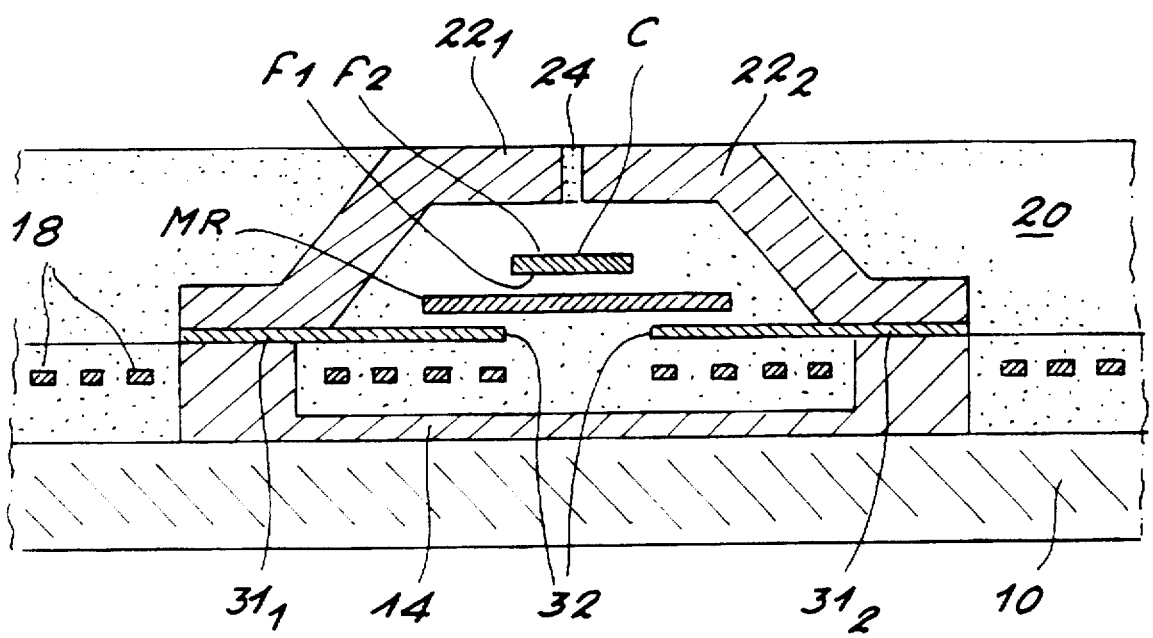
FIG. 2, already described, shows another magnetic head with a magnetoresistant element and polarization conductor.
Figure 10:
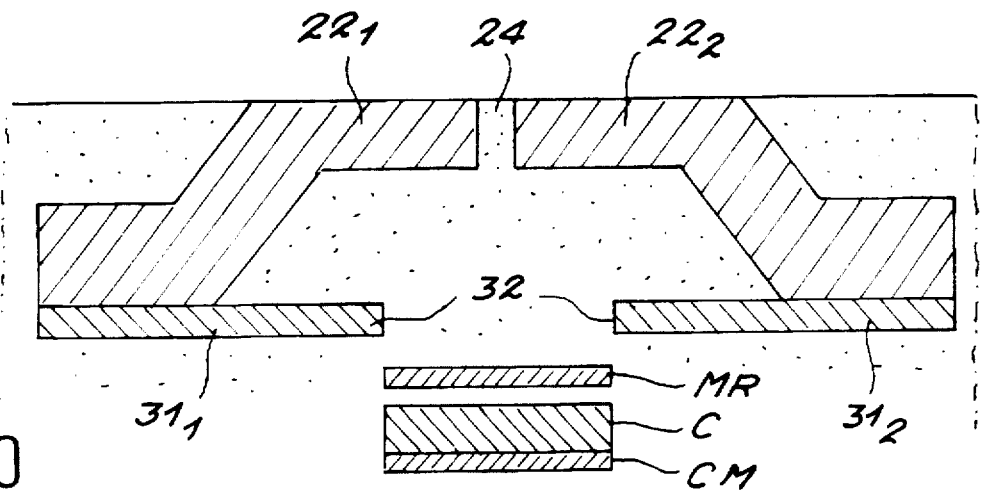
FIG. 10 illustrates an embodiment in which th magnetoresistance and its polarization means are located beneath the second head gap.

Finally, FIG. 10 shows a head of a known type, as illustrated in FIG. 2, but in which the assembly constituted by the magnetoresistant element MR, polarization conductor C and supplementary magnetic layer CM is placed below and not above the head gap 32.

We claim:

1. Thin film, horizontal, magnetic reading head comprising a magnetic circuit with at least two upper pole pieces separated by a magnetic read head gap of insulation and a lower pole piece insulated from the upper pole piece, a magnetoresistant element at least partly closing the magnetic circuit and means for polarizing the magnetoresistant element including a conductor through which flows an electric current, said conductor having the face turned towards the magnetoresistant element and another face opposite to said element, the polarization means also including a supplementary magnetic layer placed on the polarization conductor on the face opposite to the magnetoresistant element to channel magnetic field lines of said conductor therethrough and reduce magnetic leaks to the upper pole pieces.

2. Magnetic head according to claim 1, characterized in that the magnetoresistant element is in contact with the conductor.

3. Magnetic head according to claim 1, characterized in that the supplementary magnetic layer is of iron-based alloy.

4. Magnetic head according to claim 3, characterized in that the supplementary magnetic layer is of iron-nickel alloy.

5. Magnetic head according to claim 1, characterized in that the supplementary magnetic layer is of cobalt-based alloy.

6. Magnetic head according to claim 5, characterized in that the supplementary magnetic layer is of cobalt-zirconium-niobium alloy.

7. Magnetic head according to claim 1, characterized in that the supplementary magnetic layer has a width equal or substantially equal to the width of the conductor.

8. Magnetic head according to any one of the claims 1 to 7, characterized in that the magnetic head has two magnetic layers in contact with the two upper pole pieces and spaced from one another by a second head gap placed beneath the head gap defined by the two upper pole pieces, an assembly of the magnetoresistant element the conductor and supplementary magnetic layer being placed through said second head gap.

9. Magnetic head according to claim 8, characterized in that the assembly of the magnetoresistant element -conductor -supplementary magnetic layer is placed above the second head gap defined by the two magnetic layers.

10. Magnetic head according to claim 8, characterized in that the assembly of the magnetoresistant element -conductor -supplementary magnetic layer is placed below the second head gap defined by the two magnetic layers.

11. Magnetic head according to any one of the claims 1 to 7, characterized in that the magnetoresistant element extends between said two upper pole pieces the conductor and the supplementary magnetic layer being placed between the magnetoresistant element and the head gap.

12. Magnetic head according to any one of the claims 1 to 7, characterized in that the magnetic circuit has two upper pole pieces defining the head gap, the magnetoresistant element being placed beneath said head gap, the conductor beneath said element and the supplementary magnetic layer beneath the conductor.

* * * * *